(12) United States Patent
Karasawa

(10) Patent No.: US 8,687,284 B2
(45) Date of Patent: Apr. 1, 2014

(54) LENS APPARATUS

(75) Inventor: Katsumi Karasawa, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 40 days.

(21) Appl. No.: 13/094,404

(22) Filed: Apr. 26, 2011

(65) Prior Publication Data

US 2011/0267706 A1 Nov. 3, 2011

(30) Foreign Application Priority Data

Apr. 30, 2010 (JP) .................................. 2010-105330

(51) Int. Cl.
*G02B 15/14* (2006.01)

(52) U.S. Cl.
USPC ........................................................ 359/698

(58) Field of Classification Search
USPC ................. 359/676, 697, 698; 396/80–82, 86
See application file for complete search history.

(56) References Cited

U.S. PATENT DOCUMENTS

| | | | |
|---|---|---|---|
| 5,157,432 A * | 10/1992 | Fukuoka et al. | ................. 396/81 |
| 5,270,763 A | 12/1993 | Ogasawara | |
| 5,398,095 A | 3/1995 | Tsukamoto et al. | |
| 6,085,041 A | 7/2000 | Shiokama | |
| 6,417,883 B1 | 7/2002 | Kaneda | |
| 7,853,138 B2 | 12/2010 | Yoshida | |
| 8,265,473 B2 | 9/2012 | Yoshida | |
| 2002/0109784 A1 | 8/2002 | Suda et al. | |
| 2005/0052564 A1 | 3/2005 | Ishii | |
| 2008/0199174 A1 | 8/2008 | Yoshida | |
| 2009/0002543 A1 | 1/2009 | Tomita et al. | |
| 2011/0052176 A1 | 3/2011 | Yoshida | |
| 2012/0308219 A1 | 12/2012 | Yoshida | |

FOREIGN PATENT DOCUMENTS

| | | |
|---|---|---|
| JP | 2005-292779 A | 10/2005 |
| JP | 2005292779 A | 10/2005 |
| JP | 2006313229 A | 11/2006 |
| JP | 2008233889 A | 10/2008 |
| JP | 2009-145645 A | 7/2009 |

OTHER PUBLICATIONS

Communication Pursuant to Article 94(3) EPC issued Aug. 23, 2011 for corresponding EP Patent Application No. 11162933.3.
European Search Report in corresponding in EP 11 16 2933, dated Aug. 3, 2011.
Chinese Office Action issued Dec. 3, 2012 for corresponding 201110110391.9.

* cited by examiner

*Primary Examiner* — Alicia M Harrington
(74) *Attorney, Agent, or Firm* — Rossi, Kimms & McDowell LLP

(57) ABSTRACT

A lens apparatus has an image pickup optical system including a focus lens and a zoom lens, a focus detector, a defocus amount calculating unit, and a controller. The focus detector detects a focus state of the image pickup optical system. The defocus amount calculation unit calculates a defocus amount based on the detected focus state. The controller calculates a driving amount necessary to drive the focus lens to a focus position based on the calculated defocus amount. The controller controls the driving of the focus lens. In particular, the controller controls a driving speed of the focus lens depending on the calculated defocus amount and the calculated driving amount.

7 Claims, 8 Drawing Sheets

RELATIONSHIP BETWEEN FOCUS DRIVING AMOUNT
AND DEFOCUS AMOUNT

LENS APPARATUS

BACKGROUND OF THE INVENTION

1. Field of the Invention

The present invention relates to a lens apparatus having an automatic focus adjusting function, which is to be used for optical apparatuses such as a television lens and a video lens. The present invention also relates to an image pickup system including the lens apparatus.

2. Description of the Related Art

Conventionally, various proposals have been made as autofocus (AF) technologies to be adopted into image taking apparatuses such as a camera and a video camera. For example, the following automatic focus adjusting method is widely known. That is, beams coming from a subject through different exit pupil regions of an image taking lens are imaged onto a pair of line sensors, and a pair of image signals are obtained through photoelectric conversion performed on subject images, to thereby determine a relative position displacement amount of the pair of image signals thus obtained. Based on the displacement amount, a defocus amount of the subject is calculated, and the image taking lens is thus driven.

An in-focus position of a focus lens based on a subject distance can be determined in the AF system employing phase difference detection, and hence this AF system has such a feature that a focus state may be obtained more quickly than a contrast AF system.

Japanese Patent Application Laid-Open No. 2005-292779 discloses an autofocus system in which a focus lens is moved based on a contrast of a subject image. The autofocus system includes a focus demand that enables manual setting of a driving speed of the focus lens and a cut-off frequency of a filter for detecting the contrast. At a speed designated with the focus demand, the focus lens is driven to an in-focus position.

Japanese Patent Application Laid-Open No. 2009-145645 discloses that a focus lens is driven at different driving speeds in two regions within a movable range of the focus lens, wherein the two regions are different from each other in moving amount of the focus lens relative to a change amount of a focus state. A depth of field (in particular, near-side depth of field) is shallower (smaller) on a close side than on an infinity side in terms of a subject distance, and hence when the focus lens is driven at the same speed, an image blur amount changes slowly on the infinity side while changing quickly on the close side. Thus, there is a difference in manner of change in image blur amount. In order to prevent the above-mentioned phenomenon that the manner of change in image blur amount differs depending on the subject distance, the driving speed of the focus lens is changed in two stages depending on a focus range.

In general, when a depth of focus is defined as a degree of a defocus amount D within which it may be determined that an in-focus state is obtained, the depth of focus may be expressed as $2 \times Fno \times \delta$, where Fno represents an f-number and $\delta$ represents a permissible circle of confusion. Hence, the depth of focus is constant even at any focal length and subject distance. However, the depth of field, which indicates a range within which the subject may be determined to be actually in-focus, is expressed as the following expressions (1) and (2), where d1 and d2 represent a near-side depth of field and a far-side depth of field, respectively, f represents a focal length of the lens and L represents a subject distance.

$$d1 = \delta \times Fno \times L^2 / (f^2 - \delta \times Fno \times L) \quad (1)$$

$$d2 = \delta \times Fno \times L^2 / (f^2 + \delta \times Fno \times L) \quad (2)$$

From the above-mentioned expressions, the depths of field d1 and d2 are smaller as the subject distance L is smaller, and the depths of field are also smaller as the focal length f of the lens is larger.

FIG. 6 shows a relationship between the defocus amount indicating an in-focus degree and the subject distance, and between the defocus amount and the focal length of the lens. FIG. 6 shows a change in defocus amount at the same driving amount of the focus lens. On a wide-angle side on which the focal length of the lens is small, the change in defocus amount relative to the change in driving amount of the focus lens is extremely small. In other words, in the same defocus amount, the driving amount of the focus lens necessary to obtain the in-focus state is larger as the focal length of the lens is smaller.

FIG. 7 shows an example of a focus lens driving locus in a case where a zoom position is in a telephoto side. The axis of abscissa represents time and the axis of ordinate represents a position of the focus lens. In FIG. 7, a depth of focus D and a threshold value 2D of the defocus amount respectively indicate the positions of the focus lens corresponding thereto. The same applies to the description that is given later referring to FIGS. 3, 4, and 8.

During a period from a time t0 to a time t1, the focus lens is driven at high speed in a direction in which the defocus amount is zero. The focus state is monitored as necessary even during the driving of the focus lens, and when the defocus amount reaches to a predetermined value (threshold value corresponding to positive/negative focal depths), the driving speed of the focus lens is shifted to a low speed. During a period from the time t1 to a time t2, in which the defocus amount falls within the range of the threshold value, the focus lens is driven at low speed, and is stopped at an in-focus point, at which the defocus amount is zero. By driving the focus lens as described above, that is, quickly driving the focus lens at high speed and driving the focus lens at low speed in the vicinity of the in-focus point, the in-focus state is obtained with high accuracy without passing through the in-focus point.

Hereinafter, FIG. 8 shows an example of a focus lens driving locus in a case where the driving method for the focus lens on the telephoto side shown in FIG. 7 is applied to the wide-angle side. Similarly to the case of FIG. 7 where the zoom position is on the telephoto side, during the period from the time t0 to the time t1, the focus lens is driven at high speed in the direction in which the defocus amount is zero. The focus state is monitored as necessary even during the driving of the focus lens, and when the defocus amount reaches to the predetermined value (threshold value corresponding to the positive/negative focal depths), the driving speed of the focus lens is shifted to low speed. During the period from the time t1 to the time t2, in which the defocus amount falls within the range of the threshold value, the focus lens is driven at low speed, and is stopped at the in-focus point, at which the defocus amount is zero. However, on the wide-angle side, the depth of focus is large and hence the position of the focus lens within the threshold value of the low speed driving is very distant from the in-focus point. As a result, it takes an extremely long period of time for the low speed driving (from the time t1 to the time t2).

In a case where the threshold value for determining the shift from the high speed driving to the low speed driving is set based on the defocus amount (depth of focus), the depth of field corresponding to the depth of focus is large on the wide-angle side, and hence on the wide-angle side, the focus lens is shifted to the low speed driving at a position that is more distant from the in-focus point than on the telephoto side. Therefore, when the position of the shift to the low speed driving is determined based on the depth of focus, as shown in FIG. 8, it takes an extremely long period of time for the low speed driving (from the time t1 to the time t2) on the wide-angle side, with the result that the focus lens cannot be moved quickly to the in-focus point.

SUMMARY OF THE INVENTION

The present invention aims to provide an automatic focus adjusting apparatus capable of quickly obtaining an in-focus state irrespective of a focal length of a lens.

In order to achieve the above-mentioned aim, the present invention provides a lens apparatus including: an image pickup optical system including a focus lens and a zoom lens; a focus detector for detecting a focus state of the image pickup optical system; a defocus amount calculation unit for calculating a defocus amount based on a result of a detection performed by the focus detector; a driving amount calculation unit for calculating a driving amount necessary to drive the focus lens to a focus position based on the defocus amount calculated by the defocus amount calculation unit; and a controller for controlling a driving of the focus lens, in which the controller controls a driving speed of the focus lens depending on the defocus amount calculated by the defocus amount calculation unit and the driving amount calculated by the driving amount calculation unit.

According to the present invention, the lens apparatus having the automatic focus adjusting function, which is capable of quickly obtaining the in-focus state irrespective of the focal length of the lens, can be provided.

Further features of the present invention become apparent from the following description of exemplary embodiments with reference to the attached drawings.

DESCRIPTION OF THE EMBODIMENTS

First Embodiment

Figure 1:
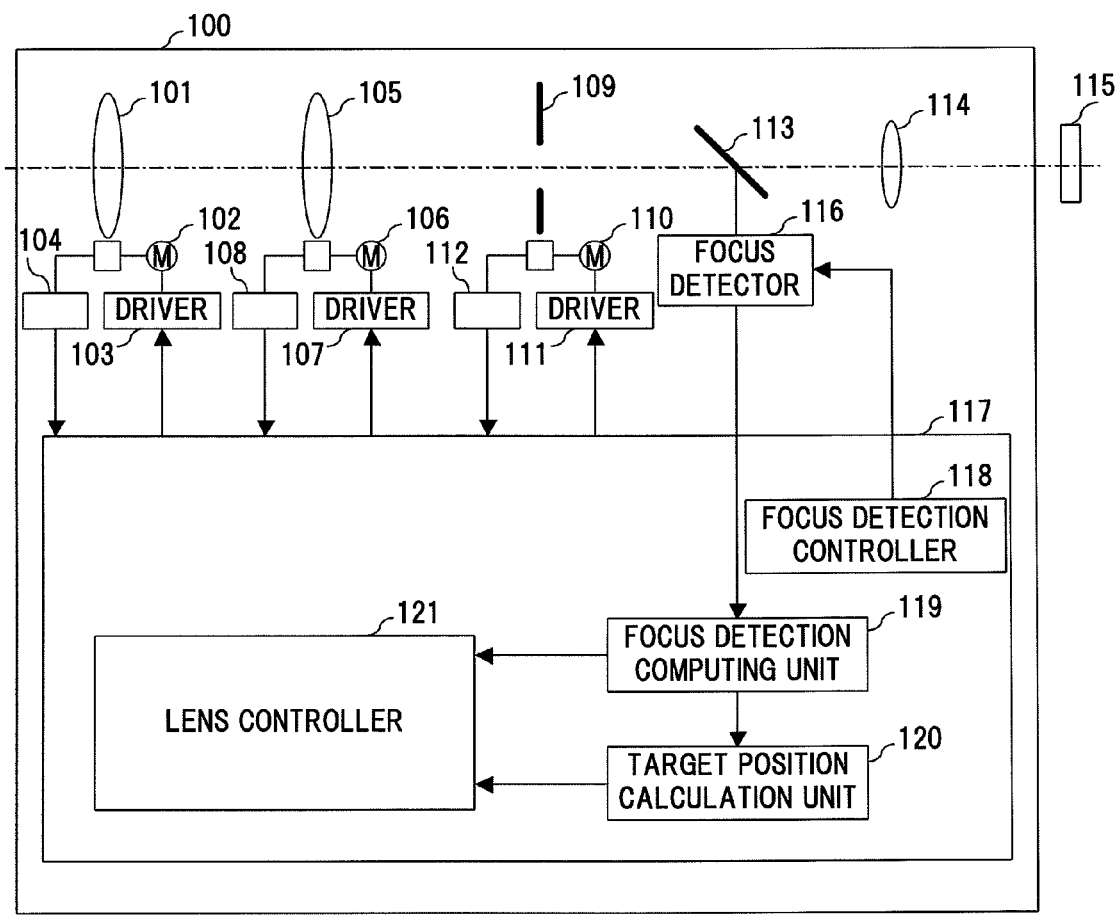
FIG. 1 is a block diagram according to a first embodiment of the present invention.

FIG. 1 illustrates a configuration of a zoom lens apparatus 100, which is a lens apparatus employing an automatic focus adjustment according to a first embodiment of the present invention.

The zoom lens apparatus 100 includes an image pickup optical system including a focus lens 101, a zoom lens 105 and a movable stop 109.

The focus lens 101 moves in an optical axis direction to change a position of an image plane of the zoom lens apparatus 100.

A focus motor 102 is connected to the focus lens 101. The focus motor 102 is driven by a focus driver 103 to move the focus lens 101 in the optical axis direction. A position of the focus lens 101 is detected by a focus position detector 104.

The zoom lens 105 moves in the optical axis direction to change a focal length of the zoom lens apparatus 100. A zoom motor 106 is connected to the zoom lens 105. The zoom motor 106 is driven by a zoom driver 107 to move the zoom lens 105 in the optical axis direction. A position of the zoom lens 105 is detected by a zoom position detector 108.

An iris motor 110 is connected to the movable stop 109. The iris motor 110 is driven by an iris driver 111 to drive the movable stop 109. A position of the movable stop 109 is detected by an iris position detector 112.

A beam-splitting prism 113 splits light passing through the focus lens 101 and the zoom lens 105 into two beams. The one beam transmitted through the beam-splitting prism 113 enters an image pickup element 115 through a relay lens 114. On the other hand, the other beam reflected on the beam-splitting prism 113 enters a focus detector 116. The focus detector 116 is constituted by a phase difference detecting lens and a phase difference detection sensor. In the focus detector 116, a pair of images of the two split beams formed by the respective phase difference detecting lenses is subjected to photoelectric conversion by the phase difference detection sensor.

A zoom lens controller 117 includes a lens controller 121 for driving the focus lens 101 based on a result from a focus detection computing unit 119, and controlling the zoom lens 105 and the movable stop 109.

A focus detection controller 118 controls accumulation of charges obtained through the photoelectric conversion, which is performed by the phase difference detection sensor of the focus detector 116, and reading of the two images with a necessary amount of charges accumulated by the phase difference detection sensor. The focus detection computing unit (defocus amount calculation unit) 119 calculates a phase difference between the pair of image signals obtained through the photoelectric conversion by the focus detector 116, to thereby calculate a defocus amount. A target position calculation unit 120 calculates a target position of the focus lens based on the defocus amount calculated by the focus detection computing unit 119.

The lens controller 121 serving as a controlling unit controls the driving of the focus lens based on the defocus amount calculated by the focus detection computing unit 119 and the target position of the focus lens calculated by the target position calculation unit 120. The lens controller 121 includes a driving amount calculation unit for calculating a driving amount necessary to move the focus lens to an in-focus position based on the target position of the focus lens calculated by the target position calculation unit 120.

Figure 7:
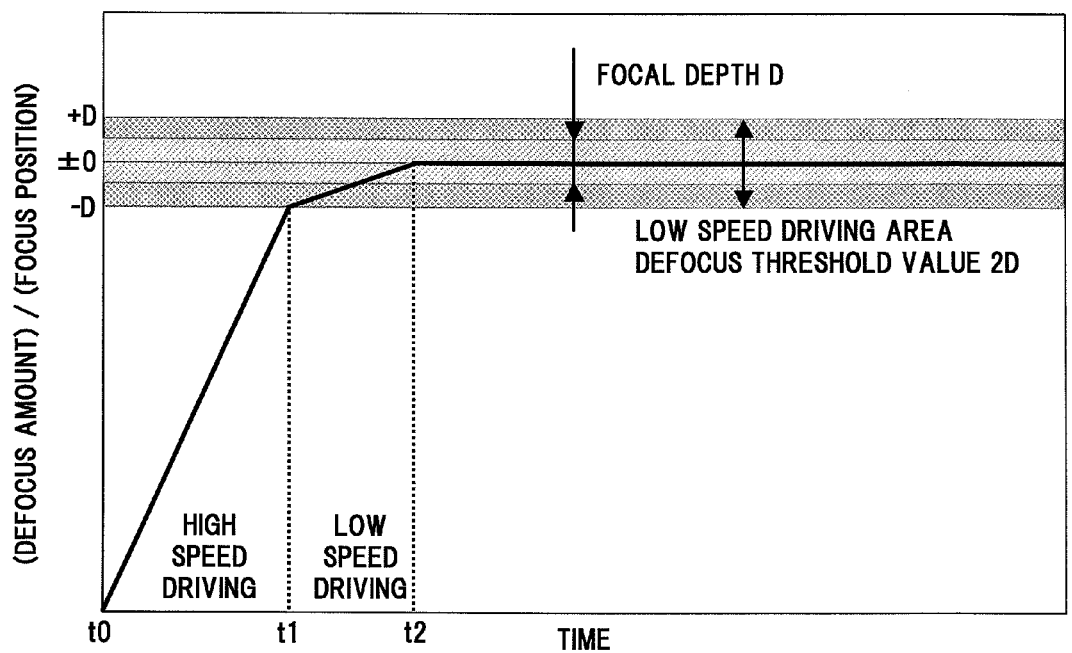
FIG. 7 shows a focus lens locus indicating operation of a conventional focus lens.
Figure 8:
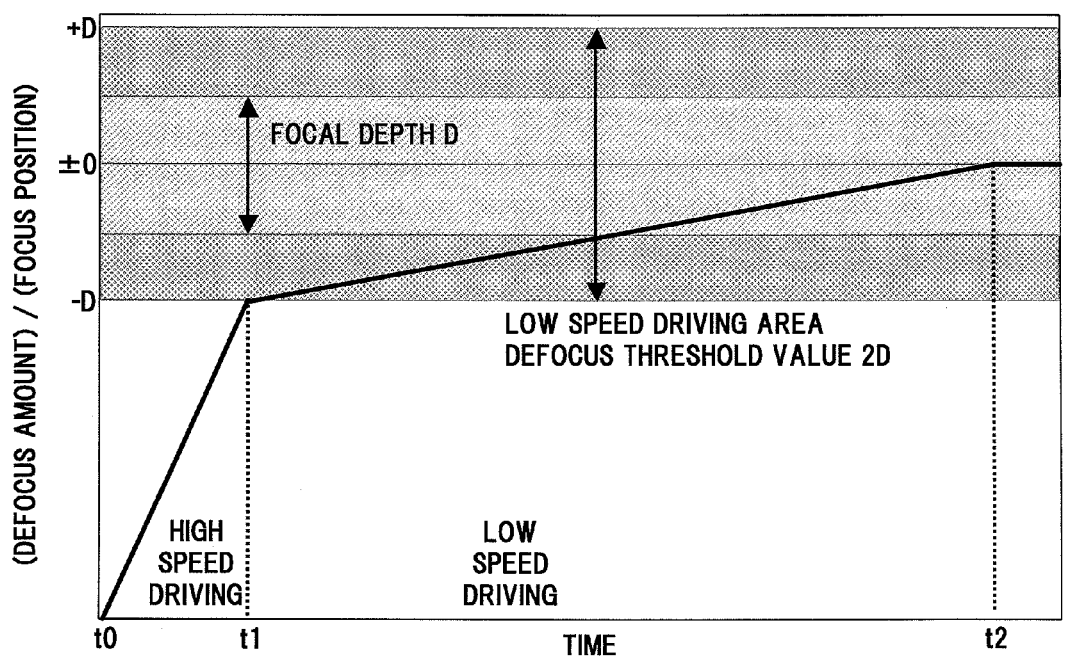
FIG. 8 shows a focus lens locus indicating operation of the conventional focus lens.

As shown in FIGS. 7 and 8, a threshold value is set based on the defocus amount corresponding to a depth of focus to drive the focus lens quickly to the in-focus position, and such setting is effective on a telephoto side but is not effective on a wide-angle side. In the present invention, in order to drive the focus lens quickly to the in-focus position irrespective of whether the zoom position is on the telephoto side or on the wide-angle side, a second threshold value effective only on the wide-angle side is also applied in addition to the threshold value based on the defocus amount.

Figure 2:
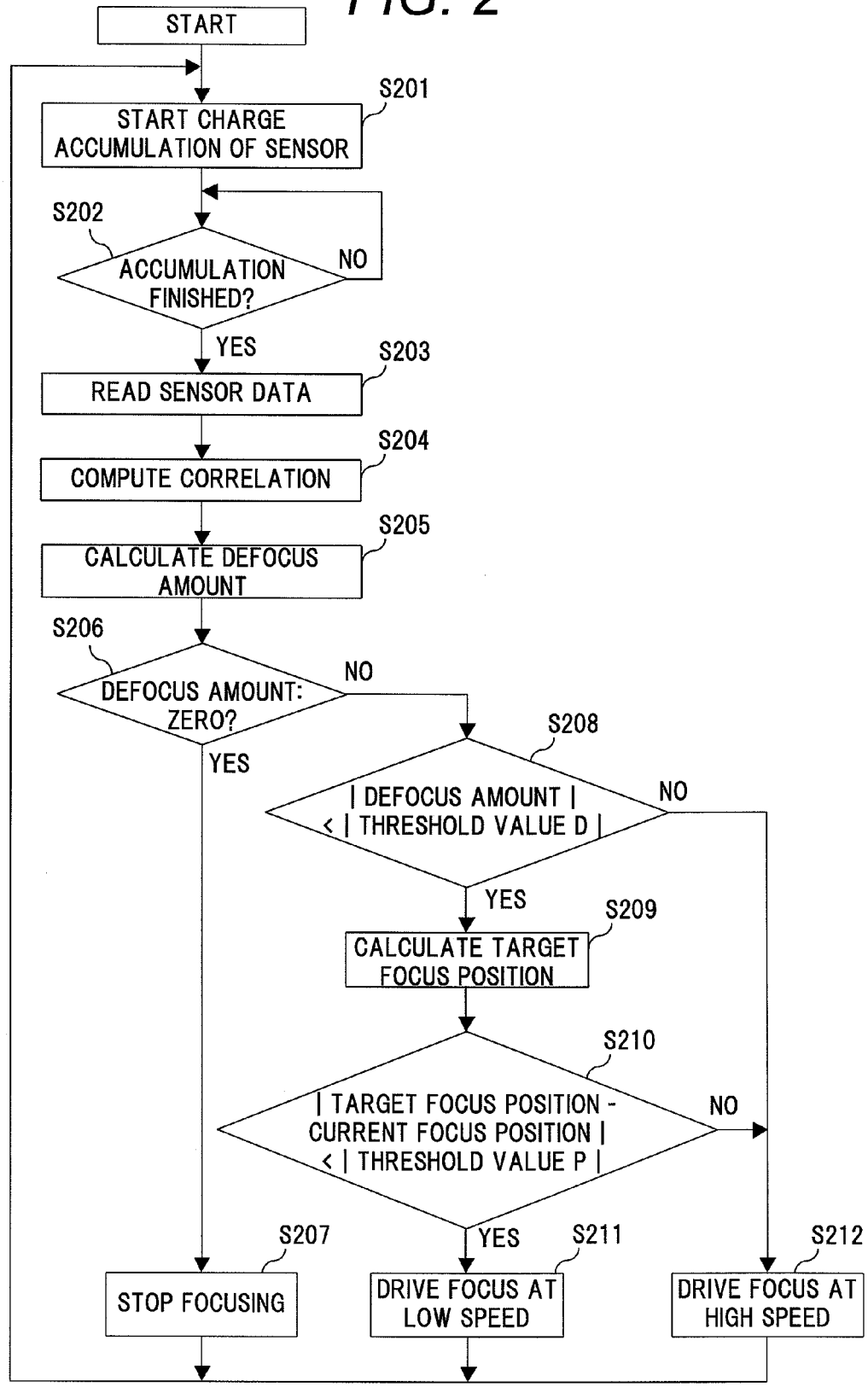
FIG. 2 is a flow chart illustrating operation of a focus lens according to the first embodiment.

Referring to the configuration of FIG. 1 and a flow chart of FIG. 2, a control method for the driving of the focus lens according to the present invention is described.

In Step S201 of FIG. 2, in response to charge accumulation start instruction for the phase difference detection sensor from the focus detection controller 118, the phase difference detection sensor of the focus detector 116 starts accumulation of charges obtained through the photoelectric conversion, and the process proceeds to Step S202. In Step S202, the focus detection controller 118 monitors whether or not a signal indicating the finish of accumulation is sent from the phase difference detection sensor of the focus detector 116, and when the accumulation is finished, the process proceeds to Step S203.

In Step S203, the focus detection controller 118 reads a pair of image signals with a necessary amount of charges accumulated in the phase difference detection sensor of the focus detector 116, and the processing proceeds to Step S204. In Step S204, the focus detection computing unit 119 performs correlation computing on the pair of image signals read from the phase difference detection sensor of the focus detector 116, to thereby calculate a phase difference amount of the two images. Then, the process proceeds to Step S205. In Step S205, a defocus amount indicating an in-focus degree is calculated based on the phase difference amount calculated by the focus detection computing unit 119, and the process proceeds to Step S206.

In Step S206, the lens controller 121 determines the defocus amount calculated by the focus detection computing unit 119. When the defocus amount is zero, the process proceeds to Step S207. In Step S207, the lens controller 121 determines that an in-focus state is obtained because the defocus amount calculated by the focus detection computing unit 119 is zero, and the lens controller 121 stops driving the focus lens 101. Then, the process returns to Step S201.

When the defocus amount is not zero in Step S206, the process proceeds to Step S208. In Step S208, the defocus amount calculated by the focus detection computing unit 119 is compared to a predetermined threshold value D to determine whether or not the following expression (3) is satisfied:

$$|(\text{defocus amount})|<|(\text{threshold value } D)| \quad (3)$$

When the expression (3) is satisfied, the process proceeds to Step S209, and when the expression (3) is not satisfied, the process proceeds to Step S212. In Step S209, based on the defocus amount calculated by the focus detection computing unit 119, the target position calculation unit 120 calculates a target focus position, and the process proceeds to Step S210.

In Step S210, based on the target focus position calculated by the target position calculation unit 120, the lens controller 121 calculates a driving amount of the focus lens with reference to a current position of the focus lens, and the calculated driving amount is compared to a predetermined threshold value P to determine whether or not the following expression (4) is satisfied:

$$|(\text{target focus position})-(\text{current focus position})|<|(\text{threshold value } P)| \quad (4)$$

When the expression (4) is satisfied, the process proceeds to Step S211. Specifically, when the driving amount necessary to drive the focus lens to the in-focus position (|(target focus position)−(current focus position)|) is smaller than the predetermined driving amount, the process proceeds to Step S211. When the expression (4) is not satisfied, that is, when the driving amount necessary to drive the focus lens to the in-focus position is equal to or larger than the predetermined driving amount, the process proceeds to Step S212. In this case, the necessary driving amount may be calculated continuously by detecting the position of the focus lens in a predetermined period and using the detection results. Alternatively, the necessary driving amount may be calculated by a difference between the driving amount calculated for the first time and an integrated value of instructions sent to the focus lens. In Step S211, the lens controller 121 shifts the driving speed of the focus lens 101 to low speed driving (driving performed at lower speed than high speed driving), and the process returns to Step S201.

In Step S212, the lens controller 121 shifts the driving speed of the focus lens 101 to high speed driving (driving performed at higher speed than the above-mentioned low speed driving), and the process returns to Step S201 to repeat the series of operations.

Figure 3:
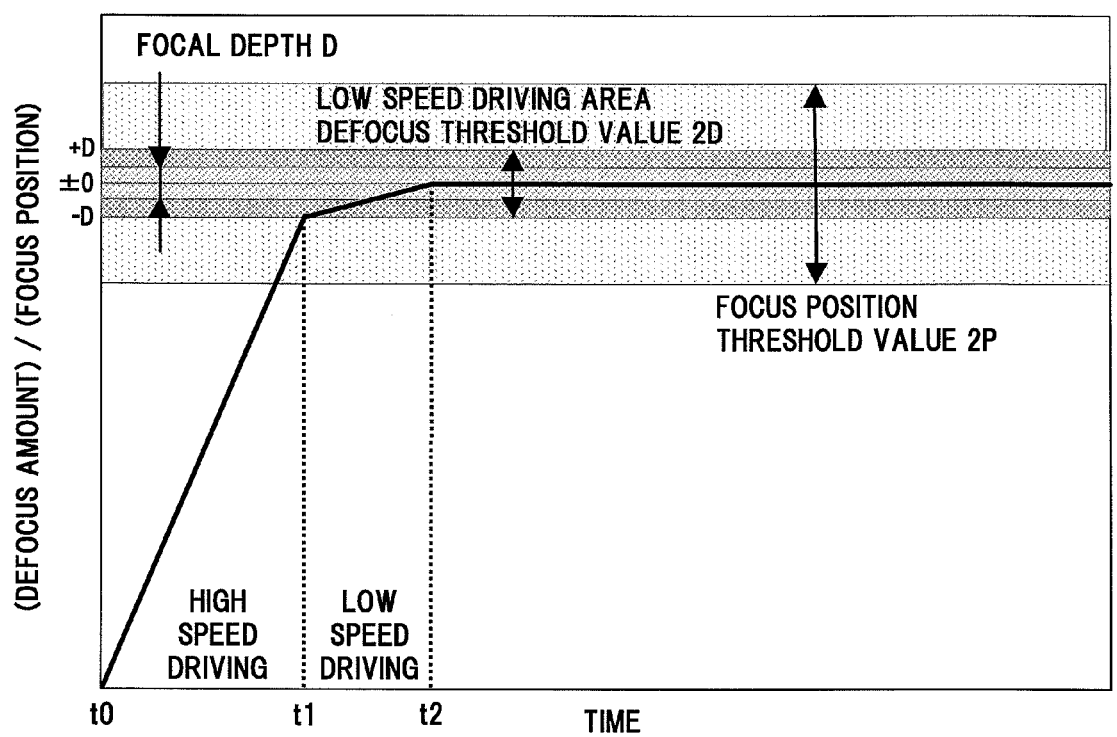
FIG. 3 shows a focus lens locus indicating operation of the focus lens according to the first embodiment.

FIG. 3 shows a focus lens driving locus in a case where the zoom position is on the telephoto side (on a side on which the focal length of the lens is large). In FIG. 3, the indication of a depth of focus D on the axis of ordinate is shown at a position of the focus lens corresponding to the depth of focus D.

During a period from a time t0 to a time t1, the defocus amount is equal to or larger than a predetermined defocus amount (in this case, equal to or larger than the threshold value D corresponding to positive/negative focal depths), and hence the focus lens is driven at high speed (first driving speed) in a direction in which the defocus amount is zero. A focus state is monitored as necessary even during the driving of the focus lens, and when the defocus amount is smaller than a predetermined value (in this case, threshold value D corresponding to the positive/negative focal depths), the driving speed of the focus lens is shifted to low speed (second driving speed). At the time t1, the condition of Step S208 is satisfied and hence the target focus position is calculated in Step S209. Then, the process proceeds to Step S210. The condition of Step S210 is also satisfied and hence the process proceeds to Step S211, in which the focus lens is driven at low speed during a period from the time t1 to a time t2, and the driving of the focus lens is stopped at an in-focus point, at which the defocus amount is zero.

Figure 4:
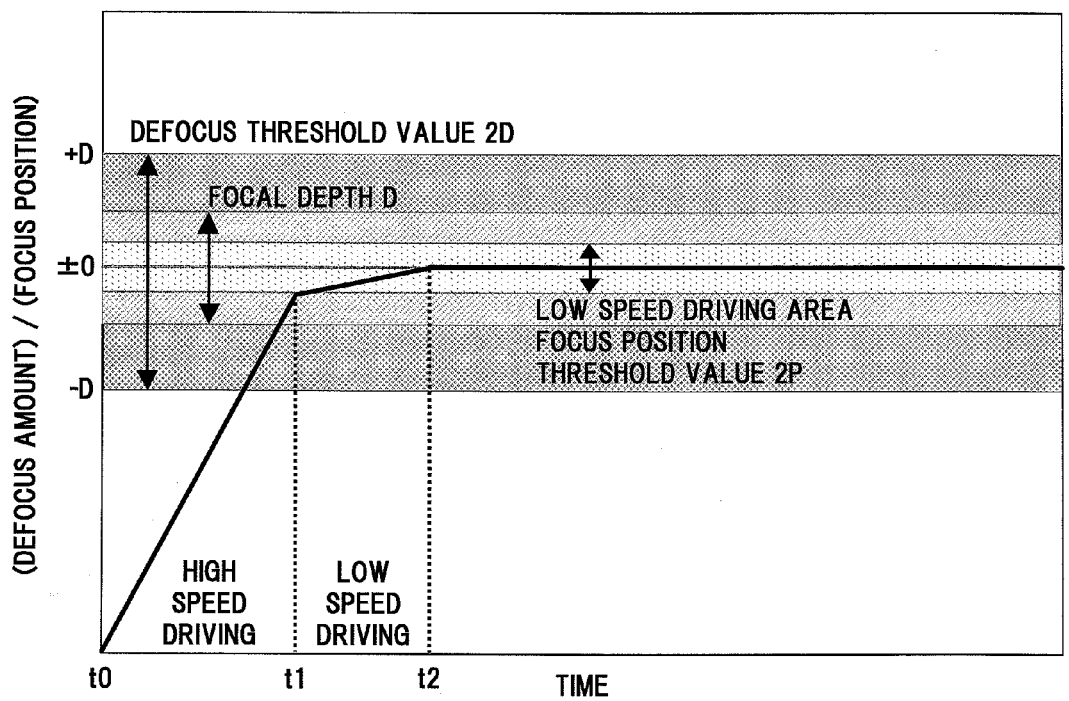
FIG. 4 shows a focus lens locus indicating operation of the focus lens according to the first embodiment.

FIG. 4 shows a focus lens driving locus in a case where the zoom position is on the wide-angle side (on a side on which the focal length of the lens is small). Similarly to the case of FIG. 8, the focus lens is driven at high speed in the direction in which the defocus amount is zero during the period from the time t0 to the time t1. Note that, regarding the scale of the axis of ordinate in the graph, the threshold values 2P shown in FIGS. 3 and 4 are actually the same within the entire zoom range but the scale of the axis of ordinate in the graph of FIG. 4 is reduced as compared to the graph of FIG. 3 for convenience of the illustration.

The focus state is monitored as necessary even during the driving of the focus lens. Within the period from the time t0 to the time t1, the defocus amount becomes smaller than a predetermined value (in this case, threshold value corresponding to the positive/negative focal depths), and hence the condition of Step S208 is satisfied. However, the driving amount necessary to move the focus lens to the in-focus position is equal to or larger than a predetermined driving amount, that is, the threshold value P, and hence the condition of Step S210 is not satisfied. Then, the processing proceeds from Step S210 to Step S212, and the focus lens is driven at high speed. At the time t1, the condition of Step S210 is satisfied and hence the focus lens is driven at low speed during the period from the time t1 to the time t2. Then, the driving of the focus lens is stopped at the in-focus point of the focus lens, at which the defocus amount is zero.

Now, the threshold value D and the threshold value P, which are used for the determination in Step S210, are described.

The threshold value D is given based on the defocus amount corresponding to the depth of focus. In this embodiment, as described above, the threshold value is set as the defocus amount corresponding to the positive/negative focal depths from the in-focus position. As described above, the depth of focus is constant irrespective of the focal length, but the depth of field corresponding to the depth of focus is determined as the function of the focal length f as expressed in the expressions (1) and (2). Hence, the driving amount of the focus lens corresponding to the threshold value D is larger on the wide-angle side than on the telephoto side.

The threshold value P is an amount corresponding to the driving amount of the focus lens, and is an amount determined based on a driving amount $P_{Wide}$ of the focus lens corresponding to the depth of focus at the wide-angle end. For example, the threshold value P may be set as follows:

$$P=P_{Wide} \times n \text{ (}n\text{: constant satisfying } 0<n<1) \tag{5}$$

Considering the near-side depth of field and the far-side depth of field, the threshold value P may be used in a distinct manner, that is, a threshold value $P_{Far}$ for a case where the in-focus state is obtained from an infinity side and a threshold value $P_{Near}$ for a case where the in-focus state is obtained from a close side may be used. FIGS. 3 and 4 each show a range of 2×P including the threshold values P on both sides of the in-focus position (wide-angle side and telephoto side). The threshold value P thus set is applied within the entire zoom range according to the flow chart of FIG. 2.

When the threshold value P is set small, even on the wide-angle side, the focus lens is driven at high speed to the vicinity of the in-focus position within a large depth of field, and thus the focus lens may be moved to the in-focus position quickly. However, in the focus detection method of the phase difference detection system, an interval between two images formed on line sensors is smaller on the wide-angle side than on the telephoto side, and hence detection accuracy (resolution) of defocus amount detection is low on the wide-angle side in principle, with the result that the detected defocus amount in the wide-angle side is not as stable as that in the telephoto side. Therefore, when the constant n of the expression (5) is set small so that the range of the high speed driving is set up to the immediate vicinity of the in-focus position, the in-focus position that is a focus detection result is not stable but always changes, and accordingly the focus lens needs to respond to the change continuously and sensitively while being driven at high speed, which is not preferred. Further, it is not significant that the focus lens be moved quickly to the in-focus position determined based on the unstable defocus amount fluctuating in a very small range. Therefore, it is preferred to set such a threshold value P that, even when the in-focus position that is the focus detection result continues to change in a given very small range, the focus lens responds thereto while absorbing the instability of the in-focus position through the low speed driving but does not respond continuously and sensitively while being driven at high speed. The threshold value P (predetermined driving amount) is set to a value smaller than that of the driving amount of the focus lens corresponding to the depth of focus at the wide-angle end of the image pickup optical system. By setting the constant n of the expression (5) in a range of 0.8<n<0.1, preferably 0.5<n<0.15, more preferably 0.3<n<0.2, the effect of the present invention may be obtained.

On the telephoto side, the focal length is large and hence the threshold value D that is set based on the depth of field expressed in each of the expressions (1) and (2) is smaller than the threshold value P. Therefore, the focus lens is driven at high speed to the position indicated by the threshold value D so that the focus lens may be moved to the in-focus position quickly.

As described above, according to this embodiment, the quick focusing operation is always enabled irrespective of the focal length of the lens.

Second Embodiment

Figure 5:
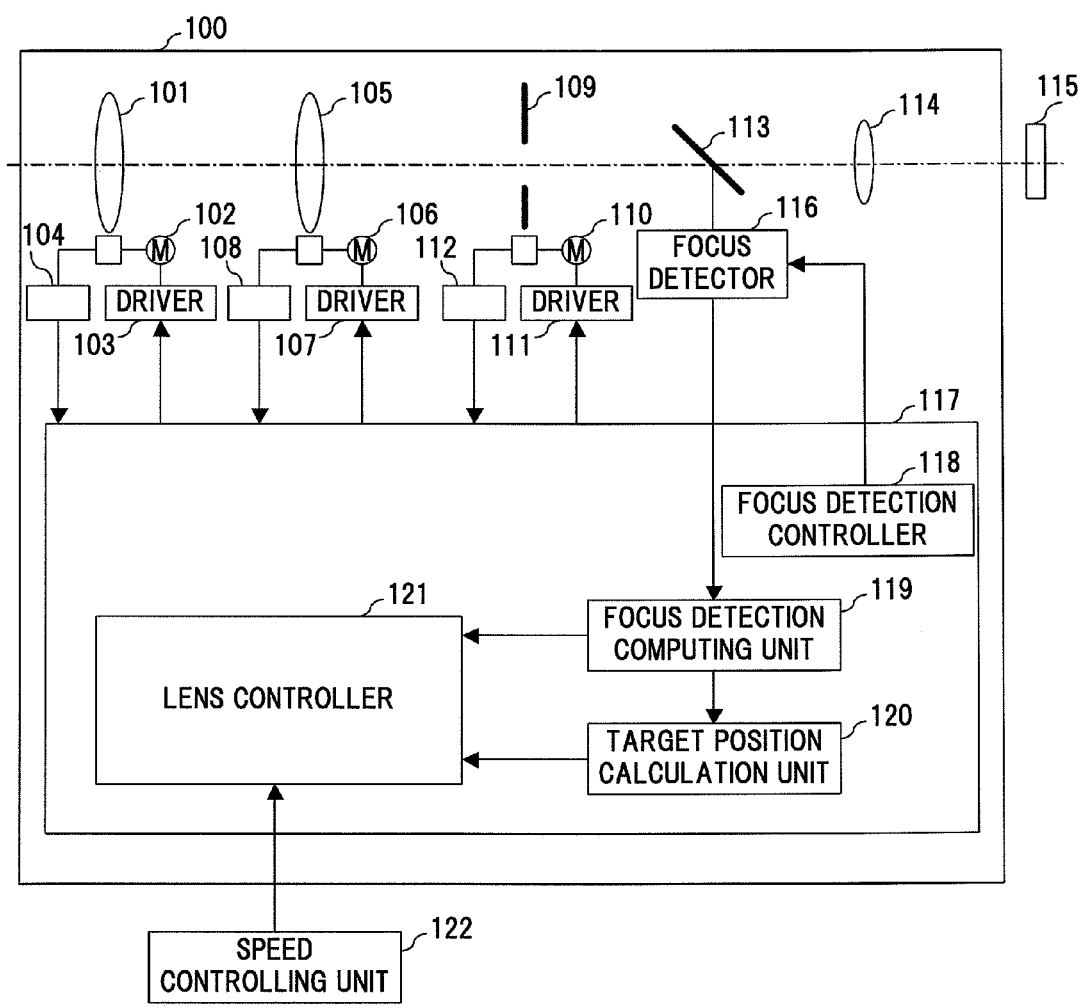
FIG. 5 is a block diagram according to a second embodiment of the present invention.
Figure 6:
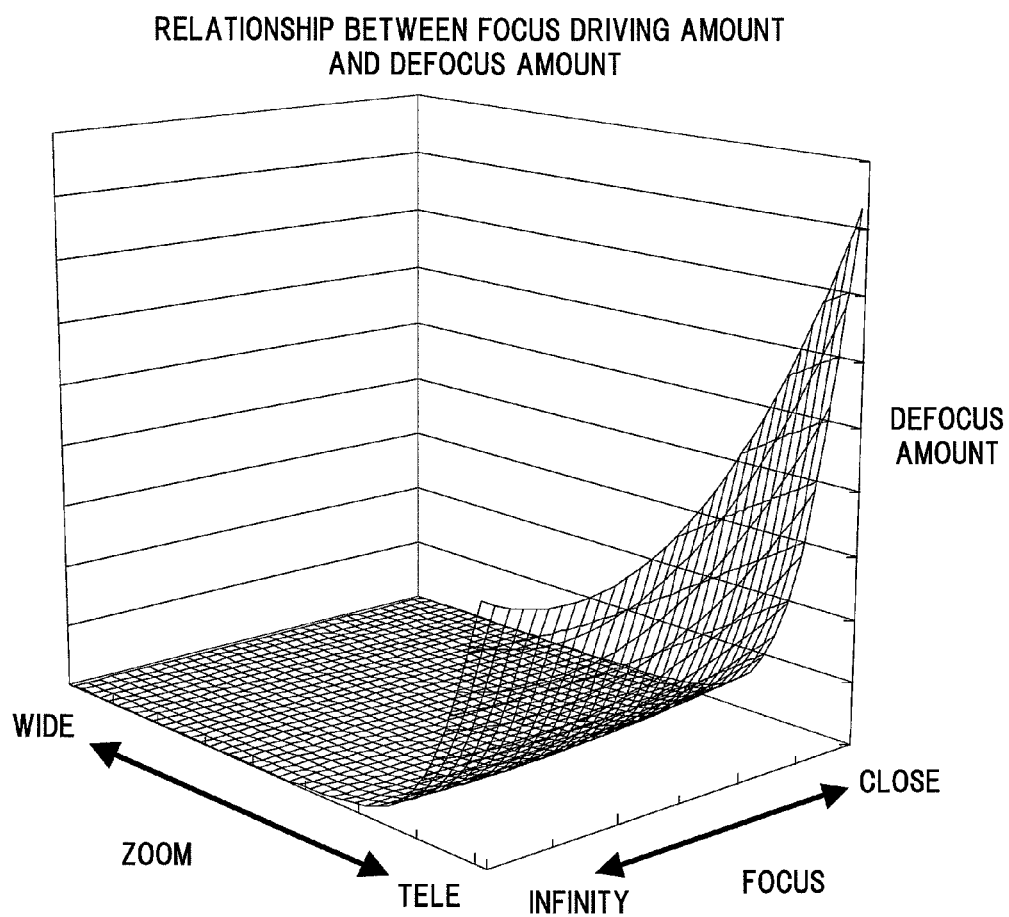
FIG. 6 is a graph showing a defocus amount.

FIG. 5 is a configuration diagram according to a second embodiment of the present invention. Description is herein omitted on the same components as those of the first embodiment illustrated in FIG. 1.

The configuration according to the second embodiment is different from the configuration according to the first embodiment in that a speed controller 122 is provided. The speed controller 122 is connected to the lens controller 121, and is capable of changing the settings of the driving speed of the focus lens and the threshold value at the point of change.

The speed controller 122 is capable of setting the driving speed of the focus lens for each of the high speed driving and the low speed driving, and of changing the set speed arbitrarily. In the setting of the driving speed, instead of setting the driving speeds both for the high speed driving and for the low speed driving, the driving speed for the high speed driving only or the low speed driving only may be set and thereby set the driving speed for the other is set adaptively.

The speed controller 122 may have a function as a setting unit capable of changing the set value of the threshold value of the defocus amount that is the point of change in driving speed.

In addition, the speed controller 122 may also have a function as a setting unit capable of changing the set value of the focus position threshold value (threshold value P) that is used for changing the driving speed. Accordingly, the focusing speed may be set depending on various image taking scenes.

By configuring an image pickup system including the lens apparatus described in each embodiment above and an image pickup apparatus connected to the lens apparatus, an image pickup system suitable for a camera, a video camera, and the like may be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-105330, filed Apr. 30, 2010, which is hereby incorporated by reference herein in its entirety.

What is claimed is:

1. A lens apparatus comprising:
   an image pickup optical system including a focus lens and a zoom lens;
   a focus detector that detects a focus state of the image pickup optical system; and
   a controller that controls a driving of the focus lens,
   wherein the controller calculates a driving amount necessary to drive the focus lens to a focus position based on a defocus amount derived based the focus state detected by the focus detector,
   wherein the controller controls a driving speed of the focus lens based on the derived defocus amount and the calculated driving amount,
   wherein the controller, in a case where the derived defocus amount is equal to or larger than a predetermined defocus amount or the calculated driving amount is equal to or larger than a predetermined driving amount, drives the focus lens at a first driving speed, wherein the controller, in a case where the derived defocus amount is smaller than the predetermined defocus amount and the calculated driving amount is smaller than the predetermined driving amount, drives the focus lens at a second driving speed, and wherein the second driving speed is lower than the first driving speed.

2. The lens apparatus according to claim 1, wherein the predetermined driving amount is smaller than a driving amount of the focus lens, which corresponds to a depth of focus at a wide-angle end of the image pickup optical system.

3. The lens apparatus according to claim 1, further comprising a speed controller that arbitrarily sets the predetermined driving amount.

4. The lens apparatus according to claim 1, further comprising a speed controller that arbitrarily sets the predetermined defocus amount.

5. The lens apparatus according to claim 1, further comprising a speed controller that arbitrarily changes the first driving speed of the focus lens.

6. The lens apparatus according to claim 1, wherein further comprising a speed controller that arbitrarily changes the second driving speed of the focus lens.

7. An image pickup system comprising:
a lens apparatus; and
an image pickup apparatus connected to the lens apparatus;
wherein the lens apparatus includes:
an image pickup optical system including a focus lens and a zoom lens;
a focus detector that detects a focus state of the image pickup optical system;
a controller that controls a driving of the focus lens,
wherein the controller calculates a driving amount necessary to drive the focus lens to a focus position based on a defocus amount derived based on the focus state detected by the focus detector,
wherein the controller controls a driving speed of the focus lens based on the derived defocus amount and the calculated driving amount,
wherein the controller, in a case where the derived defocus amount is equal to or larger than a predetermined defocus amount or the calculated driving amount is equal to or larger than a predetermined driving amount, drives the focus lens at a first driving speed,
wherein the controller, in a case where the derived defocus amount is smaller than the predetermined defocus amount and the calculated driving amount is smaller than the predetermined driving amount, drives the focus lens at a second driving speed, and
wherein the second driving speed is lower than the first driving speed.

* * * * *